(12) United States Patent
Heinisch et al.

(10) Patent No.: US 8,544,875 B2
(45) Date of Patent: Oct. 1, 2013

(54) AIRBAG HOUSING OF AN AIRBAG SYSTEM, AND AIRBAG SYSTEM

(75) Inventors: Markus Heinisch, Abstatt (DE);
Marc-Hayung Pieper, Stuttgart (DE);
Bastian Keding, Stuttgart-West (DE);
Florian Rueckert, Schoenaich (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 64 days.

(21) Appl. No.: 13/099,571

(22) Filed: May 3, 2011

(65) Prior Publication Data
US 2011/0266777 A1 Nov. 3, 2011

(30) Foreign Application Priority Data
May 3, 2010 (DE) .......................... 10 2010 016 749

(51) Int. Cl.
*B60R 21/16* (2006.01)
*B60R 21/207* (2006.01)

(52) U.S. Cl.
USPC .................................... 280/728.2; 280/730.2

(58) Field of Classification Search
USPC .................................... 280/728.2, 730.2, 732
See application file for complete search history.

(56) References Cited

U.S. PATENT DOCUMENTS

| | | | |
|---|---|---|---|
| 5,295,707 A * | 3/1994 | Satoh et al. ................ | 280/728.2 |
| 5,395,133 A | 3/1995 | Lauritzen | |
| 5,690,354 A * | 11/1997 | Logan et al. ................ | 280/728.2 |
| 5,775,723 A | 7/1998 | Dede | |
| 5,791,684 A | 8/1998 | Repp et al. | |
| 6,135,495 A | 10/2000 | Redgrave et al. | |
| 6,279,942 B1 | 8/2001 | Bossenmaier et al. | |
| 6,312,008 B1 | 11/2001 | Neag | |
| 7,183,021 B1 | 2/2007 | Akashi et al. | |
| 7,448,642 B2 * | 11/2008 | Boggess et al. ............ | 280/728.2 |
| 7,614,644 B2 * | 11/2009 | Hoffmann et al. ......... | 280/728.2 |
| 7,641,221 B2 * | 1/2010 | Boggess et al. ............ | 280/728.2 |
| 7,823,917 B2 * | 11/2010 | Suzuki et al. ................ | 280/732 |
| 8,033,566 B2 * | 10/2011 | Boggess et al. ............ | 280/728.2 |
| 2005/0263989 A1 * | 12/2005 | Helmstetter ................ | 280/728.3 |
| 2006/0091651 A1 | 5/2006 | Suzuki | |
| 2007/0290491 A1 | 12/2007 | Hoffmann | |

FOREIGN PATENT DOCUMENTS

| | | |
|---|---|---|
| DE | 10252305 | 5/2004 |
| DE | 103089945 | 9/2004 |
| DE | 202005012216 | 10/2005 |
| DE | 202009001077 | 6/2009 |
| DE | 102008051565 | 4/2010 |
| DE | 102009035484 | 2/2011 |
| EP | 0818361 | 1/1998 |
| JP | 11170954 | 6/1999 |

OTHER PUBLICATIONS

Amazon EU S.a.r.l., CMOS-Batterie CR2032 mi Stecker, Stand 24. Sep. 2009.
CNC-Modellsport GMBH, Saehan 4000, Stand 10. Jun. 2007.
Lipo-Hinweise Von Tbo ("BOGOMIR67"), Was sie schon immer uber LiPos wissen wolten, und sich nie getraut haben, danach zu Googeln, Stand Dec. 8, 2006.
British Examination Report, Jun. 22, 2012.

\* cited by examiner

*Primary Examiner* — Faye M. Fleming
(74) *Attorney, Agent, or Firm* — Gerald E. Hespos; Michael J. Porco; Matthew T. Hespos

(57) ABSTRACT

An airbag housing (1) of an airbag system (3), in particular of a side airbag system (3) of a motor vehicle, has a defined bending region (4) formed by a specific weakening of the material of the airbag housing (1) and is configured so that, on action of a mechanical load (F) on the airbag housing (1) above a predetermined threshold value, the airbag housing (1) absorbs deformation energy by deformation of the defined bending region (4).

17 Claims, 7 Drawing Sheets

AIRBAG HOUSING OF AN AIRBAG SYSTEM, AND AIRBAG SYSTEM

CROSS REFERENCE TO RELATED APPLICATION

This application claims priority under 35 USC 119 to German Patent Application No 10 2010 016 749.5 filed on May 3, 2010, the entire disclosure of which is incorporated herein by reference.

BACKGROUND OF THE INVENTION

1. Field of the Invention

The invention relates to an airbag housing of an airbag system, in particular of a side airbag system of a motor vehicle, and to an airbag system having an airbag housing of this type.

2. Description of the Related Art

The present invention is usable on any vehicle, but the invention and the problem on which the invention is based are explained in more detail herein with reference to a passenger motor vehicle.

Modern motor vehicles have a side airbag fastened to the seat side part and inflated in the event of a side crash. The side airbag is located between the vehicle seat and a vehicle structure that intrudes into the passenger compartment. However, due to the geometry of the side airbag and the component thickness thereof, the side airbag constitutes a stiff element that passes on the intrusion pulse in the event of the side crash to the vehicle seat and occupant without any reduction. This results in a severe load on the vehicle seat and on the vehicle occupant. Furthermore, a possible free space between the nondeformable side airbag and the deformable seat structure is not used, since the housing of the side airbag is very stiff.

U.S. Pat. No. 6,312,008 describes an airbag system arranged on a door pillar of a vehicle above a vehicle window. The system has an airbag housing arranged on a deformable, load-bearing structure that connects the airbag housing to the bodywork. The load-bearing structure has a U-shaped profile, and the limbs of the U shape buckle in the event of a severe load to absorb work of deformation. However, this approach is disadvantageous in that a relatively large construction space must be made available and additional components in the form of the U profile and additional fasteners are required. This increases the outlay on production and reduces the possible area of use of this type of side airbag system.

The invention is therefore based on the object of providing an improved airbag system that eliminates the abovementioned disadvantages.

SUMMARY OF THE INVENTION

An airbag housing of an airbag system, in particular a side airbag system of a motor vehicle, has a defined bending region formed by a specific weakening of the material of the airbag housing and is configured so that the defined bending region of the airbag housing deforms and absorbs deformation energy in response to a mechanical load on the airbag housing above a predetermined threshold value.

An airbag system, in particular a side airbag system for a motor vehicle, has an airbag housing of this type; an airbag air sack arranged at least partially in the airbag housing; a gas generator arranged at least partially in the airbag housing; and a further component for closing the airbag housing. The further component releases the airbag air sack when the airbag system is triggered.

A basic concept of the invention is to provide a defined bending region in the airbag housing. The bending region is configured so that, upon deformation of the defined bending region, the airbag housing absorbs deformation energy. The airbag housing therefore does not act as a stiff element passing on a mechanical load, but rather absorbs deformation energy itself.

The defined bending region preferably is designed so that action of the mechanical load on the airbag housing plastically deforms the bending region. The plastic deformation absorbs a particularly high deformation energy, thus increasing the reliability of the airbag housing.

The defined bending region preferably is configured so that action of the mechanical load on the airbag housing pivots first and second airbag housing sections about the defined bending region relative to each other. This advantageously permits defined deformation of the airbag housing.

The defined bending region preferably has a recess breaking through the airbag housing. Thus, the bending region can be produced in a particularly simple and rapid manner, thereby reducing the production costs for producing the airbag housing.

The defined bending region preferably is designed as a weakening of a wall thickness of the airbag housing. This weakening ensures that the bending region and therefore the airbag housing can be produced in a simple and rapid manner.

The defined bending region may be formed from a material that differs from a basic material of the airbag housing and has greater adaptability than the basic material. The use of a different material permits good adjustability of the deformation behavior of the bending region, and therefore the airbag housing can be used in an enlarged area of use.

The airbag housing preferably has a fastening point for mounting the airbag housing on a seat structure of a seat, thereby permitting rapid and convenient mounting of the airbag housing in a motor vehicle.

The defined bending region preferably is guided around the fastening point. Thus, deformation is certain to occur in the region of the fastening point, thereby increasing the reliability of the airbag housing.

The airbag housing preferably has side walls and a base that has the defined bending region to permit reliable and defined holding of an airbag air sack in the airbag housing. The defined bending region preferably divides the housing base approximately centrally. Thus, the airbag housing is deformed even if a load acts approximately centrally on the airbag housing.

The airbag housing preferably is formed with a metallic material, in particular a thin-walled steel sheet, to ensure that the airbag housing can be produced rapidly and cost-effectively in large piece numbers.

The airbag housing also may have a further component designed as a cover that can be blown off or blown open by a gas generator. Thus, the airbag air sack can be released safely, thereby increasing the reliability of the airbag system.

The airbag housing preferably is connected operatively to a seat structure of a seat in such a manner that, by means of the deformation of the defined bending region, a free space between the deformed seat structure and the airbag housing upon deformation of the seat structure is filled at least partially by the deformed airbag housing. Thus, deformation energy is additionally input, thereby increasing the safety and reliability of the airbag system.

DETAILED DESCRIPTION OF THE PREFERRED EMBODIMENTS

The same reference numbers are used in the figures to denote identical or functionally identical components unless stated otherwise.

Figure 1:
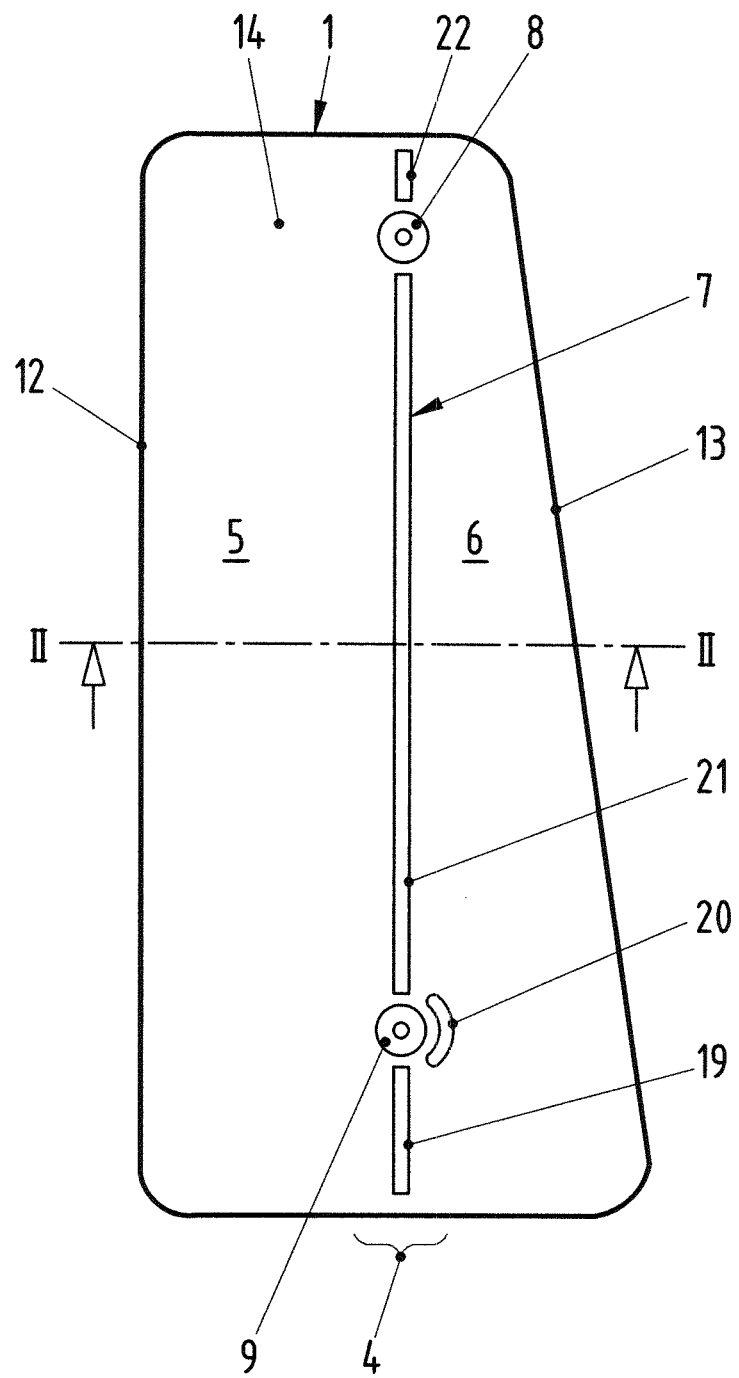
FIG. 1 is a top view of an airbag housing according to a preferred embodiment of the present invention.

FIG. 1 is a top view of an airbag housing 1 of an airbag system in accordance with the invention. The airbag housing 1 is designed, for example, for holding an airbag air sack and a gas generator of the airbag system. In alternate embodiments the airbag housing 1 is a structure that supports the airbag system and connects the airbag system, for example, to the bodywork of a vehicle, or is an airbag housing cover. The airbag housing 1 has a defined bending region 4 formed, for example, by specific weakening of the airbag housing 1. The defined bending region 4 is preferably plastically deformable. The airbag housing 1 can have a plurality of bending regions 4. The airbag housing 1 preferably is formed with walls 12, 13 provided at least on longitudinal sides of the airbag housing 1 and with a base 14. The defined bending region 4 preferably is arranged in the base 14 and divides the base preferably approximately centrally in a longitudinal direction of the airbag housing 1. The airbag housing 1 furthermore preferably is formed from a metallic material, in particular from a thin-walled steel sheet. In an exemplary embodiment of the airbag housing 1, the defined bending region 4 is designed as a recess 7 breaking through the airbag housing 1. The recess 7 has, for example, a plurality of sections 19-22 that are separated from one another by material bridges consisting of housing material. The material bridges connect first and second airbag housing sections 5 and 6 of the housing 1 to each other. The airbag housing 1 furthermore preferably has fastening points 8, 9 arranged on the base 14. The fastening points 8, 9 preferably are assigned to a common housing section 5, 6. In the case of the exemplary embodiment of the airbag housing 1 FIG. 1, this is the section 5. The fastening points 8, 9 preferably are designed as threaded inserts 8, 9 fixedly connected to the airbag housing 1. The fastening points 8, 9 are spaced apart from each other and are arranged on the base 14 of the housing 1 approximately centrally with respect to a transverse direction of the airbag housing 1. The fastening points 8, 9 preferably lie approximately in the bending region 4. The defined bending region 4 preferably is guided around the fastening points 8, 9, for example by means of a curved section 20 of the recess 7. The fastening points 8, 9 function, for example, to mount the airbag housing 1 on a seat structure of a seat.

The defined bending region 4 preferably is configured so that, when a mechanical load greater than a predetermined threshold value acts on the airbag housing 1 or on one of the sections 5, 6 of the airbag housing 1, the section pivots about the defined bending region 4 relative to the other section. In the process, the airbag housing 1 absorbs deformation energy.

Figure 2:
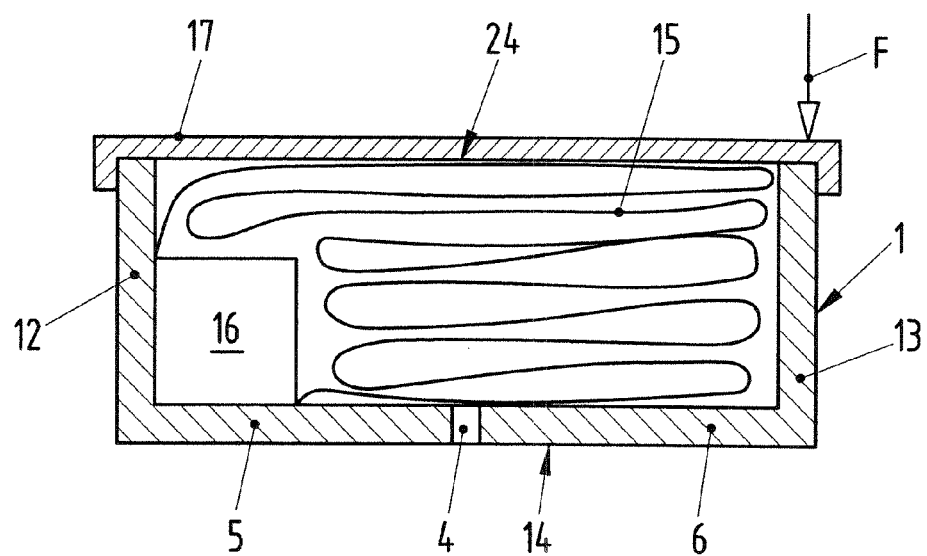
FIG. 2 is a sectional view taken along line II-II of FIG. 1.

FIG. 2 shows the airbag housing 1 in a sectional view along the section line II-II according to FIG. 1. For better representation, the sectional view is rotated by 180° with respect to FIG. 1. A collapsed airbag air sack 15 and a gas generator 16 are arranged in the airbag housing 1. The airbag housing 1 is closed by a further component or cover 17 composed of a plastics material. In the example of FIG. 2, the airbag housing 1 is fixed, for example, to the structure of the seat via the fastening points 8, 9.

Figure 3:
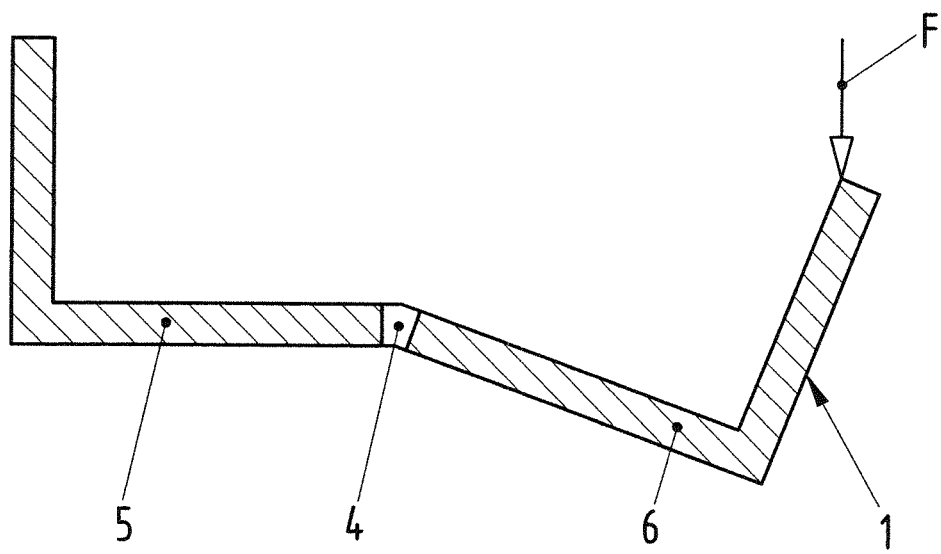
FIG. 3 is a sectional view of the airbag housing of FIGS. 1 and 2 in a deformed state.

When the airbag system 3 is triggered, the airbag air sack 15 is inflated by the gas generator 16. As a result, the cover 17 is blown open or completely blown off, for example along a breaking line 24, and the airbag air sack 15 is deployed. When a mechanical load F acts on the airbag housing 1, for example by means of a vehicle structure intruding into the passenger compartment or by means of intruding vehicle components, for example in the event of a side crash, the defined bending region 4 is deformed in such a manner that the airbag housing 1 absorbs deformation energy. In this case, a predetermined threshold value for deforming the defined bending region 4 is predetermined by the structural design of the bending region 4 and by the material used for the airbag housing 1 and for the bending region 4. Upon action of the mechanical load F above the predetermined threshold value, the second section 6, for example, of the housing 1 pivots about the defined bending region 4 relative to the first section 5 of the housing. FIG. 3 shows the airbag housing 1 of FIG. 2 with a deformed bending region 4. For simplified representation, the airbag air sack 15, the gas generator 16 and the cover are not illustrated in FIG. 3.

Figure 4:
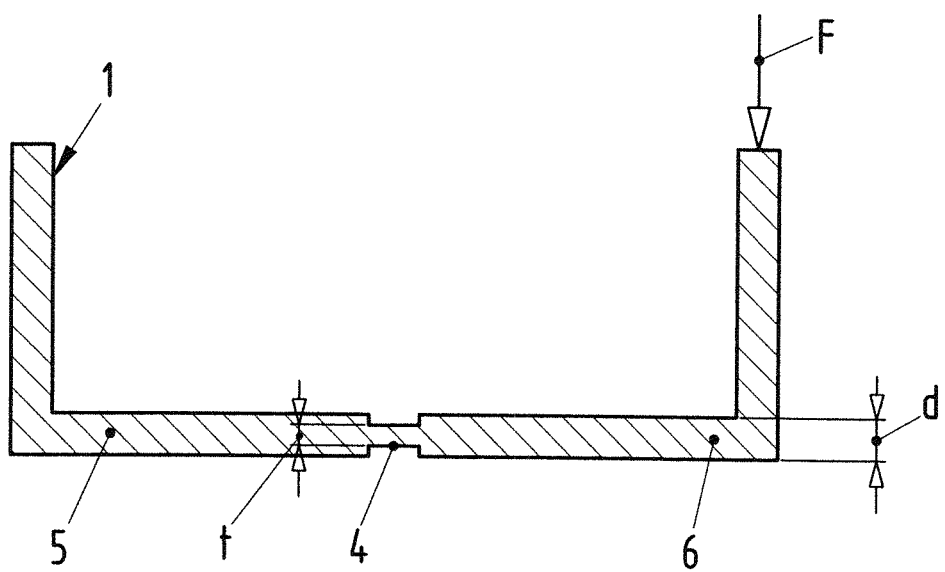
FIG. 4 is a sectional view of an airbag housing according to second embodiment of the invention.

FIG. 4 shows, in a sectional view, a second embodiment of the airbag housing 1, wherein the defined bending region is designed as a weakening of a wall thickness d of the housing 1. For this purpose, the wall thickness d of the airbag housing 1 is reduced in the region of the envisaged bending region 4 to a wall thickness t to define the bending region 4. The wall thickness d may be reduced, for example as shown in FIG. 3, on both sides or only on one side. The reduction in the wall thickness may be achieved, for example, by milling or eroding. The remaining wall thickness t is dependent on the predetermined threshold value that is intended to be achieved. In a manner similar to the recess 7 FIG. 1, the reduction in the wall thickness d to the wall thickness t can be interrupted in sections by material bridges having the original wall thickness d of the airbag housing. This achieves sufficient stability of the bending region 4 and the bending behavior of the bending region 4 can be adjusted conveniently.

Figure 5:
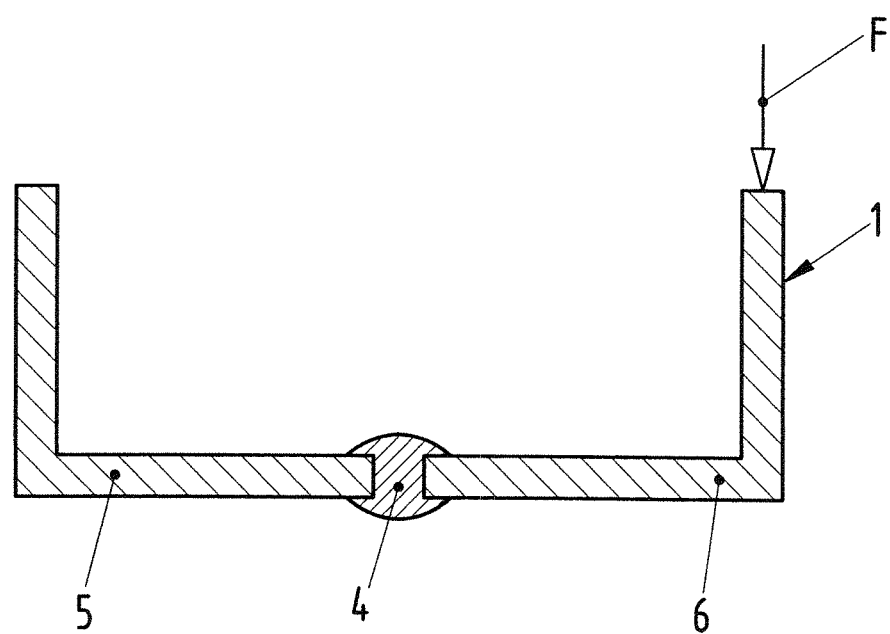
FIG. 5 is a sectional view of an airbag housing according to a third embodiment of the invention.

FIG. 5 shows a third embodiment of the airbag housing 1 where the defined bending region 4 is formed from a material differing from a basic material of the housing 1. In this embodiment, the material of the defined bending region 4 preferably has greater ductility than the basic material of the airbag housing 1. In the airbag housing 1 of FIG. 5, the bending region 4 is designed, for example, as a joint 4 between the first and second housing sections 5 and 6. The joint 4 may protrude over surfaces of the base 14 of the airbag housing 1, as illustrated in FIG. 5, or may end flush with said surfaces. For example, the first and the second housing section 5, 6 may be designed as sheet-metal components, wherein the defined bending region 4 is formed from a preferably plastically deformable plastics material. In this embodiment, the airbag housing 1 advantageously can be assembled in a plastics injection molding process, in which the sheet-metal parts 5, 6 are placed into an injection mold and the plastic bending region 4 subsequently is injected into the mold. Bridges connecting the first and the second housing sections 5, 6 and composed of the basic material of the airbag housing 1 may be provided in the bending region 4. As an alternative, the bending region 4 also may be formed from a metallic material having greater ductility than the basic material of the airbag housing 1.

Figure 6:
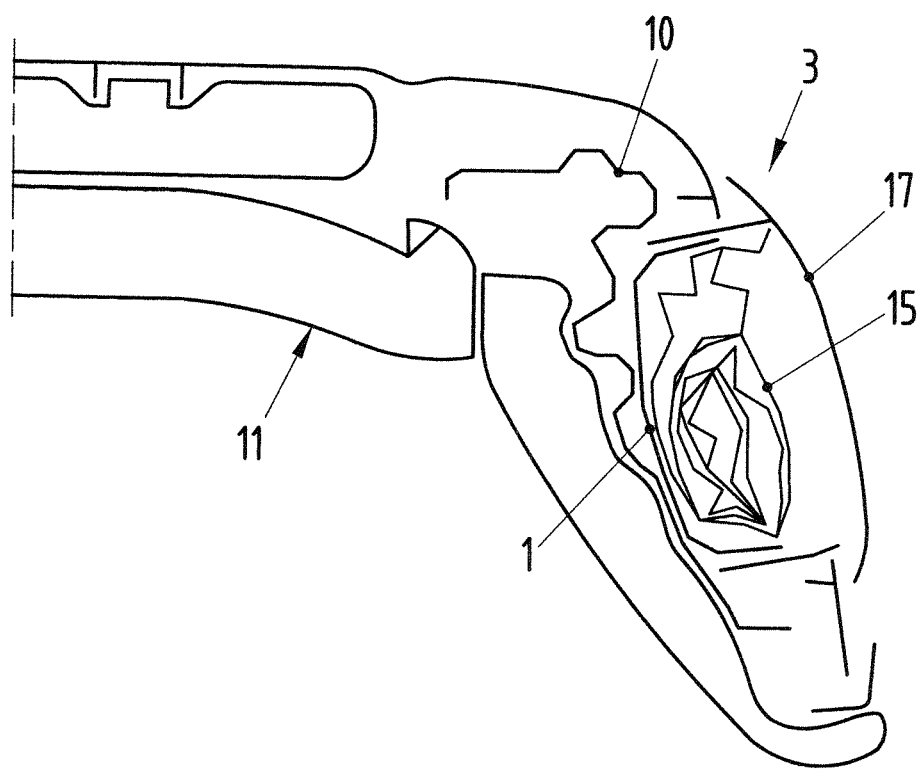
FIG. 6 is a sectional view of an airbag system with an airbag housing according to one of the embodiments from FIGS. 1 to 5.

FIG. 6 shows a side airbag system 3 with an airbag housing 1. The airbag air sack 15 and the gas generator (not illustrated specifically) are arranged in the airbag housing 1, with the cover 17 closing the airbag housing 1. As in FIG. 1, the airbag housing 1 is fixed, for example screwed, riveted or welded, to a seat structure 10 of a seat 11 by fastening points. The seat structure 10 is designed to absorb deformation energy in the event of a side crash of a motor vehicle.

Figure 7:
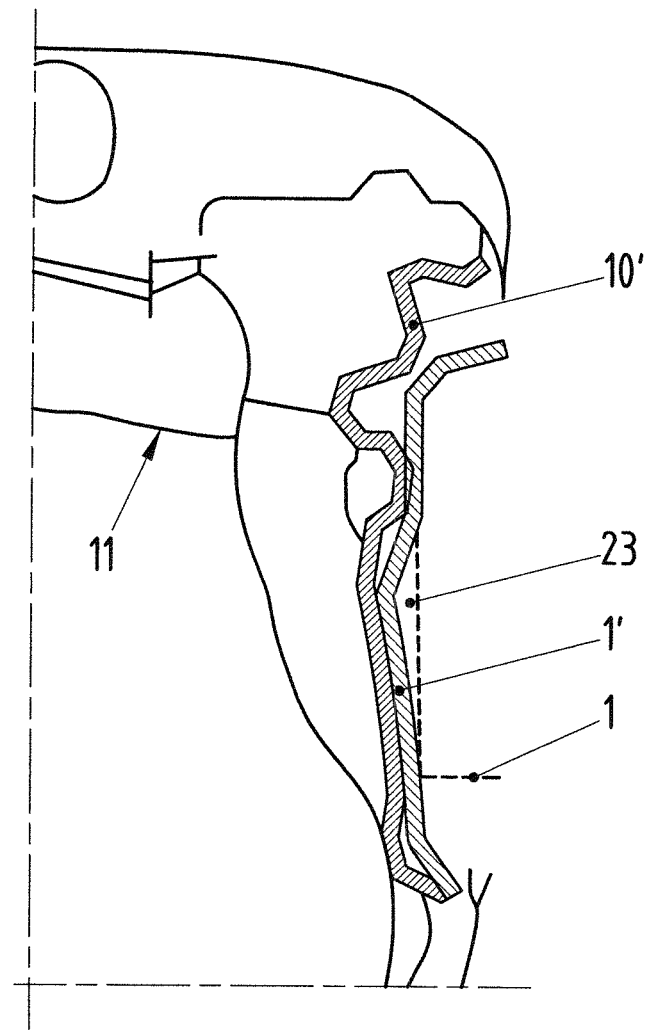
FIG. 7 is a sectional view of the airbag system of FIG. 6 after deformation of the airbag housing.

FIG. 7 shows the airbag system 3 after triggering of the airbag and deformation of the seat structure 10, illustrated by the reference number 10'. Upon intrusion of a vehicle structure into the passenger cell, the airbag housing 1 initially absorbs deformation energy due to the defined bending region 4, with the deformed airbag housing 1, illustrated by the reference number 1', following the deformed seat structure 10'. In the process, the airbag housing 1' is received at least partially in a free space 23 that would arise between the seat structure 10' and the undeformed airbag housing 1. The deformation of the defined bending region 4 causes the deformed airbag housing 1' to fill at least part of the free space. The free space 23 is illustrated in FIG. 7 with reference to the undeformed airbag housing 1 which is illustrated by dashed lines. By this means, deformation energy once again additionally can be absorbed and airbag deployment space additionally is provided.

With the airbag housing 1 and with the airbag system 3, it is therefore possible, by the provision of the defined bending region 4, for the airbag housing 1 to absorb deformation energy and therefore for force not to be directly transmitted from a vehicle structure penetrating the passenger compartment to the airbag housing 1 and the seat structure 10.

What is claimed is:

1. An airbag housing of an airbag system of a motor vehicle, the airbag housing comprising:
   a base and at least two side walls projecting from the base;
   at least one fastening point formed in the base for mounting the airbag housing on a seat structure;
   a breaking region formed in the housing opposite the base for permitting deployment of an air bag from the housing and away from the seat structure; and
   a defined bending region formed by a specific weakening of material of the base, the defined bending region being aligned to intersect the at least one fastening point and being configured so that, on action of a mechanical load on the airbag housing above a predetermined threshold value, the airbag housing absorbs deformation energy by deformation of the defined bending region and opens up additional airbag deployment space.

2. The airbag housing of claim 1, wherein the defined bending region is deformed plastically upon action of the mechanical load on the airbag housing.

3. The airbag housing of claim 1, wherein the defined bending region is configured so that, upon action of the mechanical load on the airbag housing, a first airbag housing section and a second airbag housing section pivot relative to each other about the defined bending region.

4. The airbag housing of claim 1, wherein the defined bending region has a recess breaking through the airbag housing.

5. The airbag housing of claim 1, wherein the defined bending region is designed as a weakening of a wall thickness of the airbag housing.

6. An airbag housing of an airbag system of a motor vehicle, the airbag housing comprising:
   a base;
   at least one fastening point formed in the base for mounting the airbag housing on a seat structure;
   a breaking region formed in the housing opposite the base for permitting deployment of an air bag from the housing and away from the seat structure; and
   a defined bending region formed in the base from a material that differs from a basic material of the airbag housing and has greater adaptability than the basic material so that the defined bending region forms a specific weakening of material of the airbag housing, the defined bending region being configured so that, on action of a mechanical load on the airbag housing above a predetermined threshold value, the airbag housing absorbs deformation energy by deformation of the defined bending region and opens up additional airbag deployment space.

7. The airbag housing of claim 1, wherein areas of the defined bending region substantially adjacent the fastening point are guided around the fastening point.

8. The airbag housing of claim 6, characterized in that the airbag housing has sidewalls extending from the base.

9. An airbag system of a motor vehicle, comprising:
   an airbag housing comprising a base, sidewalls extending from the base and a breaking region formed in the housing opposite the base;
   an airbag air sack arranged at least partially in the airbag housing;
   a gas generator arranged at least partially in the airbag housing; and
   a defined bending region that divides the base approximately centrally, the defined bending region being formed from a material that differs from a basic material of the airbag housing and has greater adaptability than the basic material so that the defined bending region forms a specific weakening of material of the airbag housing and being configured so that, on action of a mechanical load on the airbag housing above a predetermined threshold value, the airbag housing absorbs deformation energy by deformation of the defined bending region and opens up additional airbag deployment space.

10. The airbag housing of claim 1, characterized in that the airbag housing is formed with a metallic sheet material.

11. A side airbag system for a motor vehicle, comprising:
    an airbag housing having a base connected to a seat structure of a seat, the base having a defined bending region spaced from the seat structure by a free space, the defined bending region being formed by a specific weakening of material of the airbag housing and being configured so that, on action of a mechanical load on the airbag housing above a predetermined threshold value, the airbag housing deforms at the defined bending region for at least partially filling the free space between the seat structure and the airbag housing upon deformation of the seat structure and opening up additional deployment space;
    an airbag air sack arranged at least partially in the airbag housing;
    a gas generator arranged at least partially in the airbag housing; and
    a further component on a side of the airbag housing opposite the base for closing the airbag housing and for releasing the airbag air sack when the airbag system is triggered.

12. The airbag system of claim 11, wherein the further component is a cover that can be blown off or blown open by the gas generator.

13. An airbag system of a motor vehicle, comprising:
- an airbag housing having a base formed from a sheet metal, at least two opposed side walls projecting from the base and a defined bending region formed from plastic and molded to the base and extending along the base at locations between the sidewalls, the defined bending region being weaker than other parts of the airbag housing;
- an airbag air sack arranged at least partially in the airbag housing;
- a gas generator arranged at least partially in the airbag housing; and
- a cover supported by ends of the side wall opposite the base for closing the airbag housing and releasing the airbag air sack when the airbag system is triggered, wherein a mechanical load on the airbag housing above a predetermined threshold value deforms the airbag housing at the defined bending region and opens up additional airbag deployment space.

14. The airbag system of claim 13, wherein the defined bending region is formed by openings passing through the base, regions of the base on opposite sides of the defined bending region being connected to one another by material bridges unitary with the base.

15. The airbag system of claim 13, wherein the defined bending region is formed by thinned regions on the base.

16. The airbag system of claim 13, further comprising a plurality of attachment points at spaced apart locations on the base for attaching the housing to a supporting structure on the motor vehicle.

17. The airbag system of claim 16, wherein the defined bending region bypasses the attachment points.

* * * * *